(12) United States Patent
Fan et al.

(10) Patent No.: US 8,804,343 B2
(45) Date of Patent: Aug. 12, 2014

(54) MOUNTING APPARATUS FOR EXPANSION CARD

(75) Inventors: Chen-Lu Fan, New Taipei (TW); Chang-Gui Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 240 days.

(21) Appl. No.: 13/446,042

(22) Filed: Apr. 13, 2012

(65) Prior Publication Data
US 2013/0027891 A1    Jan. 31, 2013

(30) Foreign Application Priority Data
Jul. 5, 2011 (CN) .......................... 2011 1 0208677

(51) Int. Cl.
*H05K 1/14* (2006.01)
(52) U.S. Cl.
USPC ............................ 361/737; 361/807; 361/809
(58) Field of Classification Search
USPC ............ 361/679.01, 679.02, 679.31, 679.32, 361/728, 737, 747, 748, 759, 796, 801, 802, 361/807, 809, 810; 710/301
See application file for complete search history.

(56) References Cited

U.S. PATENT DOCUMENTS

| | | | |
|---|---|---|---|
| 6,958,916 B2* | 10/2005 | Roesner et al. | 361/790 |
| 8,149,595 B1* | 4/2012 | Wu et al. | 361/825 |
| 8,238,097 B2* | 8/2012 | Chen et al. | 361/679.58 |
| 8,254,130 B2* | 8/2012 | Fan et al. | 361/724 |
| 8,373,981 B2* | 2/2013 | Zhang et al. | 361/679.32 |
| 2013/0265716 A1* | 10/2013 | Liu | 361/679.58 |

* cited by examiner

*Primary Examiner* — Hung S Bui
(74) *Attorney, Agent, or Firm* — Novak Druce Connolly Bove + Quigg LLP

(57) ABSTRACT

A mounting apparatus for expansion cards includes a cage of a chassis, a bracket secured to the cage, a positioning member, and a circuit board. The cage includes an installation plate. The installation plate is adapted to secure a first end of a first expansion card. The positioning member is removably mounted to the cage and includes a top wall. The top wall is adapted to secure a third end of a second expansion card with a height smaller than the first expansion card. The circuit board is secured to the bracket and is adapted to secure a second end of the first expansion card and a forth end of the second expansion card. A distance between the installation plate and the top wall is substantially equal to an altitude difference between the first expansion card and the second expansion card.

20 Claims, 4 Drawing Sheets

MOUNTING APPARATUS FOR EXPANSION CARD

BACKGROUND

1. Technical Field

The present disclosure relates to mounting apparatuses and more particularly to a mounting apparatus for securing expansion cards in an electronic device.

2. Description of Related Art

A computer system usually includes expansion cards, such as sound cards, video cards, and graphics cards, for enhancing capabilities of the computer system. There may be three types of expansion cards: long cards, short cards and low profile cards. In general, the long cards have a same height as the short cards and a different length from the short cards. The low profile cards have a lower height relative to the height of the long cards and the short cards. The long cards and the short cards may be mounted to a rear window of a chassis. A height of the rear window may be substantially equal to the height of the long cards and the short cards. Under the above described configuration of the chassis, the low profile cards can not be mounted to the rear window together with the long cards and the short cards. Therefore, an improved mounting apparatus capable of securing multiple expansion cards may be desired within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
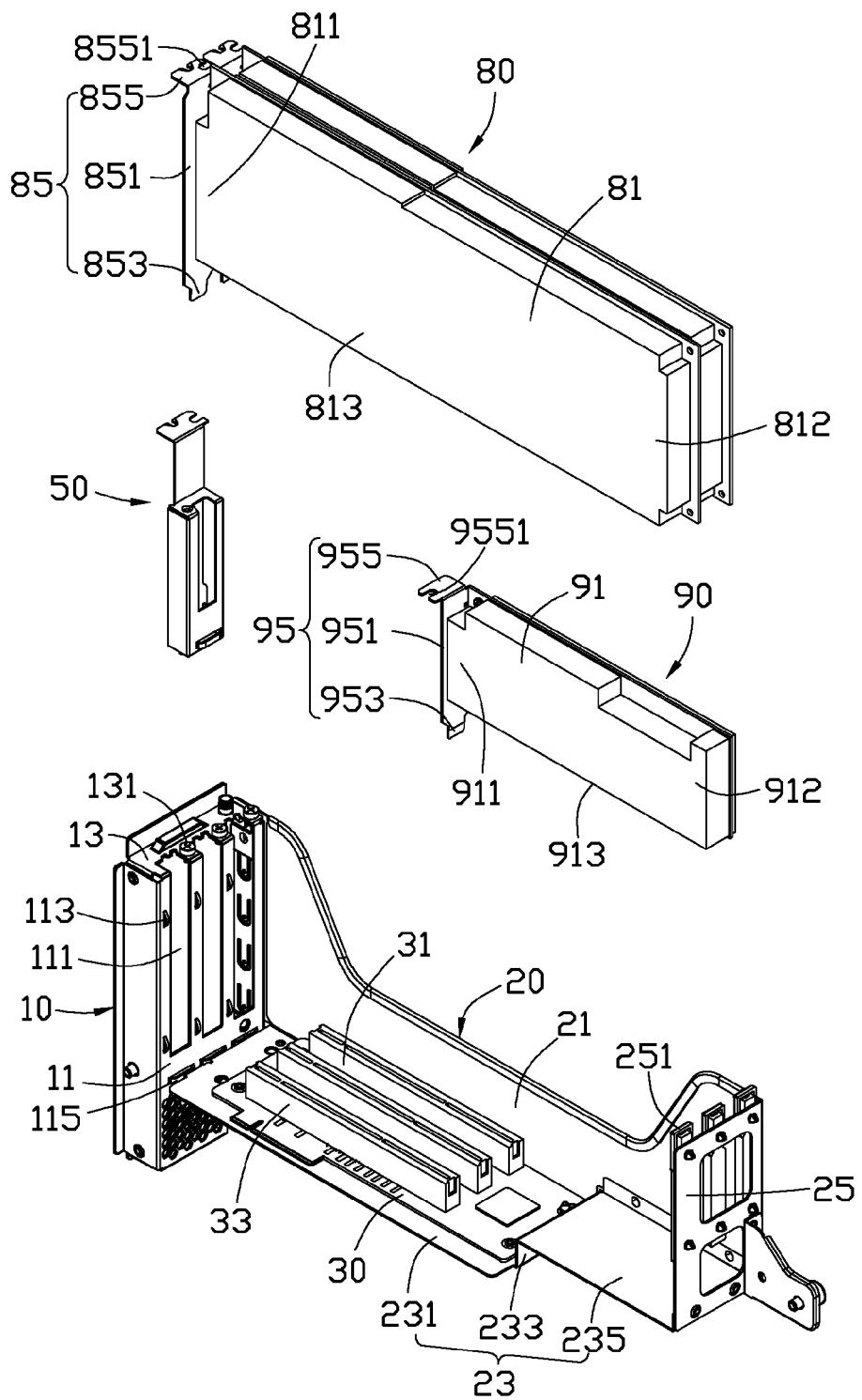
FIG. 1 is an exploded, isometric view of a mounting apparatus, two first expansion cards and a second expansion card in accordance with an exemplary embodiment.
Figure 2:
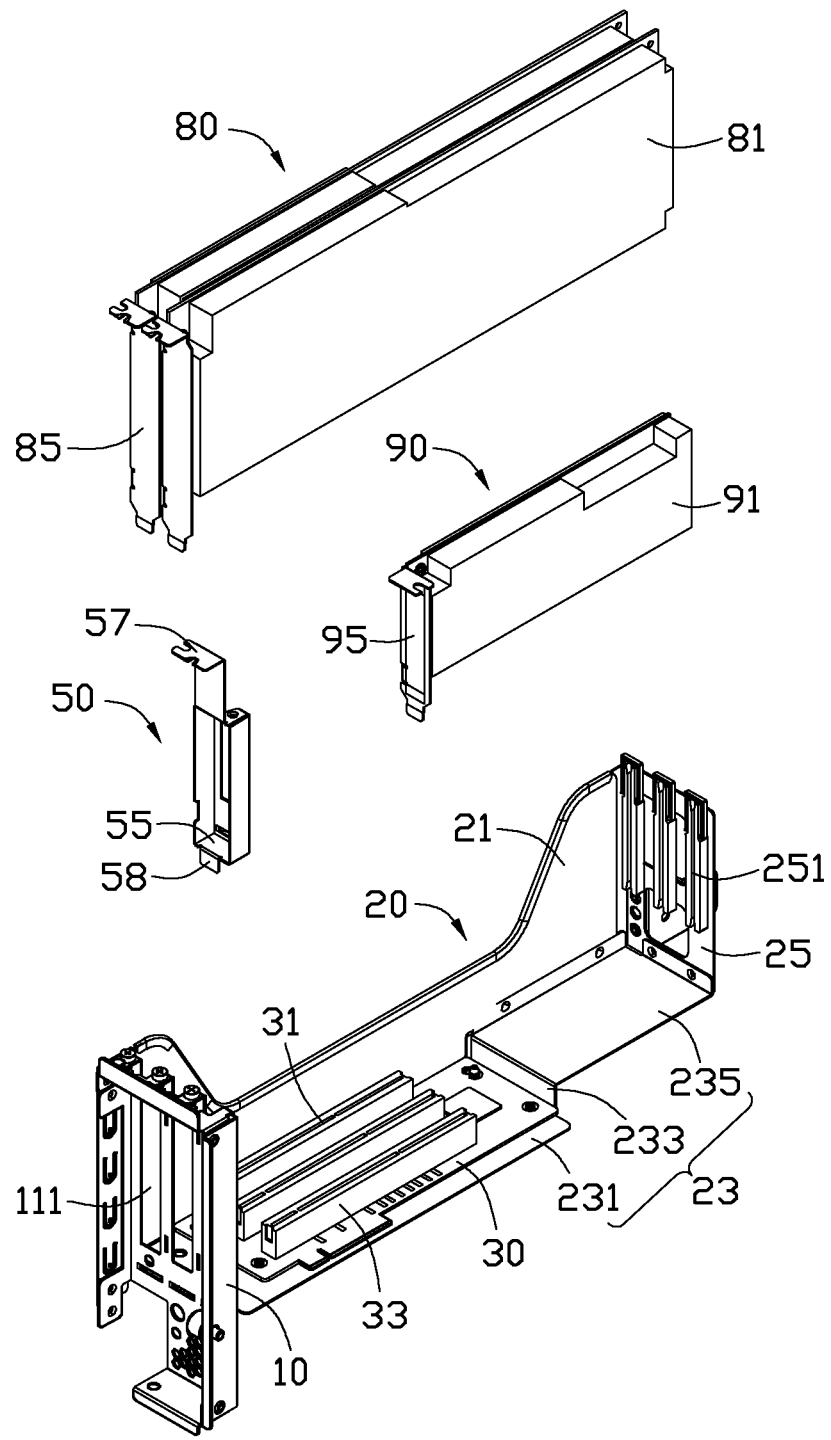
FIG. 2 is similar to FIG. 1, but viewed from another aspect.

Referring to FIG. 1 and FIG. 2, a mounting apparatus for mounting two first expansion cards 80 and a second expansion card 90 includes a cage 10, a bracket 20, a circuit board 30, and a positioning member 50. In one embodiment, the cage 10 is secure to a rear plate of a chassis of a computer.

Each of the two first expansion cards 80 includes a first card body 81 and a first installation piece 85. The first card body 81 includes a first end 811, a second end 812 opposite to the first end 811, and a third end 813 adjacent to the first end 811 and the second end 812. The first installation piece 85 is secured to the first end 811. The first installation piece 85 includes a first piece body 851, a first inserting piece 853 and a first securing piece 855. The first securing piece 855 defines a first cutout 8551. A first inserting end (not shown) is located on the third end 813, which is located between the first end 811 and the second end 812. In one embodiment, each of the two first expansion cards 80 may be a long card or a short card.

The second expansion cards 90 includes a second card body 91 and a second installation piece 95. The second card body 91 includes a fourth end 911, a fifth end 912 opposite to the fourth end 911, and a sixth end 913 adjacent to the fourth end 911 and the fifth end 912. The second installation piece 95 is secured to the fourth end 911 and includes a second piece body 951, a second inserting piece 953 and a second securing piece 955. The second securing piece 955 defines a second cutout 9551. A second inserting end (not shown) is located on the sixth end 913. In one embodiment, the second expansion card 90 is a low profile card, and a height of the second piece body 951 is smaller than that of the first piece body 851.

The cage 10 includes a positioning plate 11 and an installation plate 13 connected to the positioning plate 11. The positioning plate 11 defines a plurality of installation slots 111. A plurality of limiting protrusions 113 and a plurality of arching portions 115 are located on the positioning plate 11. Two of the plurality of limiting protrusions 113 is located on each side of each of the plurality of installation slots 111. Each of the plurality of arching portions 115 is located below each of the plurality of installation slots 111. A gap (not shown) is defined between each arching portion 115 and the positioning plate 11, for receiving the first inserting piece 853. The installation plate 13 defines a plurality of installation holes 131. In one embodiment, each of plurality of installation slots 111 is "L" shaped.

The bracket 20 includes a rear plate 21, a bottom plate 23, and a side plate 25 connected to the rear plate 21 and the bottom plate 23. In one embodiment, the rear plate 21 and the bottom plate 23 are substantially perpendicular to the positioning plate 11, and the side plate 25 is substantially parallel to the positioning plate 11. The bottom plate 23 includes a support plate 231, a connecting plate 233, and a bridge plate 235. The connecting plate 233 is connected between the support plate 231 and the bridge plate 235. In one embodiment, the support plate 231 is substantially parallel to the bridge plate 235, and the support plate 231 and the bridge plate 235 are substantially perpendicular to the connecting plate 233. A plurality of inserting plates 251 extend from the side plate 25. An inserting slot (not labeled) is defined between each adjacent two of the plurality of inserting plates 251.

The circuit board 30 can be secured to the support plate 231. The circuit board 30 defines a plurality of first connecting slots 31 and a plurality of second connecting slots 33. A distance between each of plurality of first connecting slots 31 and the positioning plate 11 is smaller than that between each of the plurality of second connecting slots 33 and the positioning plate 11. In one embodiment, the circuit board 30 is a riser card and is electronically connected to a motherboard.

Figure 3:
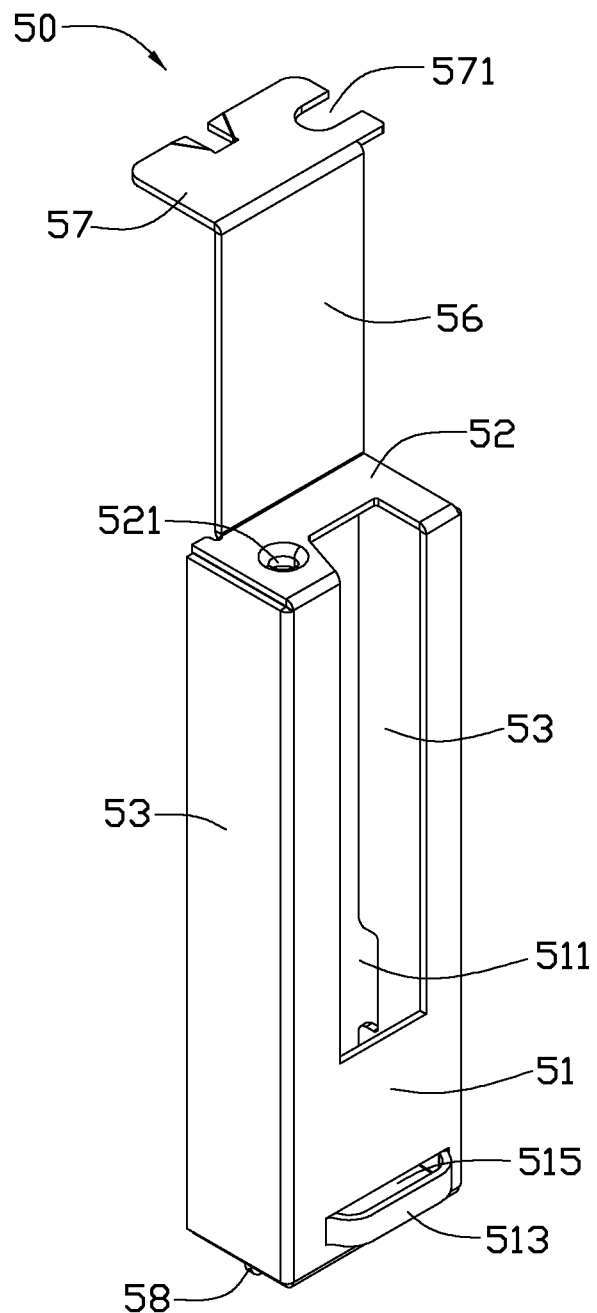
FIG. 3 is an isometric view of a positioning member of FIG. 1.

Referring to FIG. 3, the positioning member 50 includes a front wall 51, a top wall 52, a bottom wall 55, and two sidewalls 53. In one embodiment, the front wall is perpendicularly connected to the top wall 52, the bottom wall 55 and the two sidewalls 53, the top wall 52 is substantially parallel to the bottom wall 55 and substantially perpendicular to the two sidewalls 53. The front wall 51 defines a positioning slot 511. The positioning slot 511 extends to the top wall 52. In one embodiment, the positioning slot 511 is substantially "L" shaped. An inserting portion 513 protrudes from the front wall 51. In one embodiment, the inserting portion 513 is arched. A gap 515 is defined between the inserting portion 513 and the front wall 51. The top wall 52 defines a locking hole 521. A connecting piece 56 extends from the top wall 52 and is substantially parallel to front wall 51. A positioning piece 57 extends from a top edge of the connecting piece 56. In one embodiment, the positioning piece 57 is substantially parallel to the top wall 52. The positioning piece 57 defines a cutout 571. A distance between the positioning piece 57 and the top wall 52 is substantially equal to an altitude difference between the first card body 81 and the second card body 91. The distance between the positioning piece 57 and the top wall 52 is substantially equal to an altitude difference between the first piece body 851 and the second piece body 951. A limiting piece 58 extends from the bottom wall 55. An extending direction of the limiting piece 58 is opposite to an extending direction of the connecting piece 56.

Figure 4:
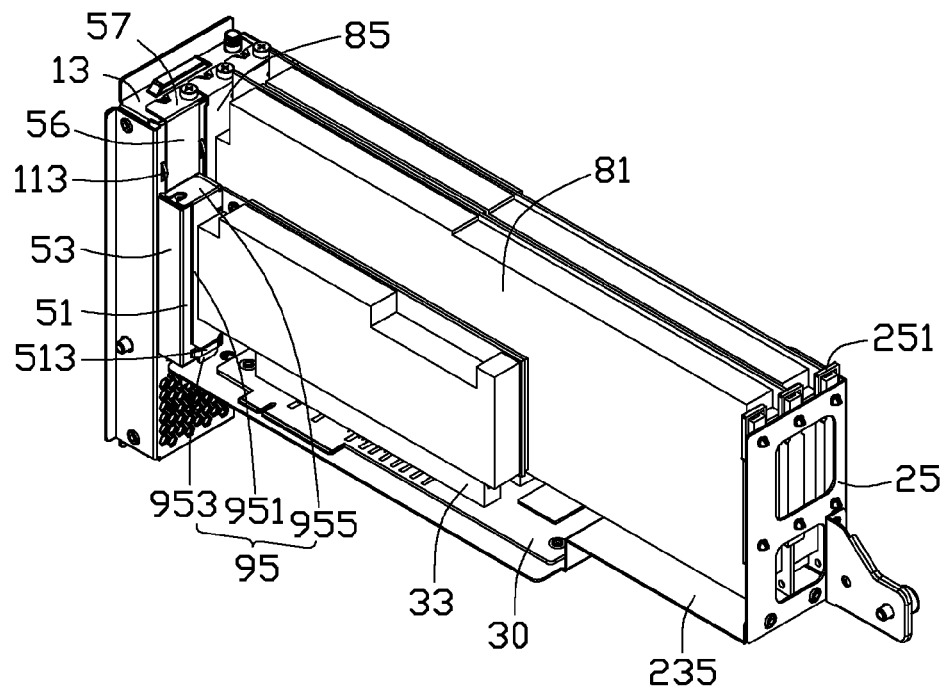
FIG. 4 is an assembled, isometric view of the mounting apparatus, the two first expansion cards and the second expansion card of FIG. 1.

Referring to FIG. 4, in assembly, the circuit board 30 is secured to the support plate 231. The inserting end of each of the two first expansion cards 80 is inserted into each of the plurality of first connecting slots 31. The first piece body 851 abuts against the positioning plate 11, the first inserting piece 853 is inserted between the arching portion 115 and the positioning plate 11, and the first securing piece 855 abuts against and locked to the installation plate 13. The second end 812 is inserted between adjacent two of the plurality of inserting plates 251.

In assembly of the second expansion card 90, the positioning member 50 is moved to adjacent to the cage 10, and the connecting piece 56 is located between two of the plurality of limiting protrusions 113 located on two opposite sides of one of the plurality of installation slots 111. The connecting piece 56 abuts against the positioning plate 11. The limiting piece 58 is aligned to the gap between the arching portion 115 and the positioning plate 11. The positioning member 50 is slid towards the circuit board 30, until the positioning piece 57 abuts the installation plate 13. The cutout 571 is aligned with each of the plurality of installation holes 131. The limiting piece 58 is inserted into the gap between the arching portion 115 and the positioning plate 11. A locking member (not shown), such as a screw, is inserted into the cutout 571 and each of the plurality of installation holes 131, to secure the positioning member 50 to the cage 10. The second expansion card 90 is moved towards the cage 10 and the bottom plate 23. The second card body 91 abuts against the front wall 51, and the second inserting piece 953 is aligned with the gap 515. The second expansion card 90 is moved towards the bottom plate 23, until the second inserting end is inserted into one of the plurality of second connecting slots 33. In this position, the second securing piece 955 abuts against the top wall 52, and the second cutout 9551 is aligned with the locking hole 521. Another locking member is inserted into the second cutout 9551 and the locking hole 521, to secure the second expansion card 90 to the positioning member 50. Thus, the first two expansion cards 80 and the second expansion card 90 can be secured to one circuit board.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A mounting apparatus for expansion cards comprising:
  a cage comprising an installation plate, and the installation plate is adapted to secure a first end of a first expansion card;
  a bracket secured to the cage;
  a positioning member removably mounted to the cage and comprising a top wall, and the top wall being adapted to secure a third end of a second expansion card having a height smaller than a height of the first expansion card; and
  a circuit board secured to the bracket and adapted to secure a second end of the first expansion card adjacent to the first end, and the circuit board is further adapted to secure a fourth end of the second expansion card adjacent to the third end;
  wherein a distance between the installation plate and the top wall is substantially equal to an altitude difference between the first expansion card and the second expansion card.

2. The mounting apparatus for expansion cards of claim 1, wherein the top wall is substantially parallel to the installation plate.

3. The mounting apparatus for expansion cards of claim 1, wherein the second expansion is a low profile card, the top wall defines a locking hole, and the locking hole is configured to secure the top wall to an installation piece of the second expansion card.

4. The mounting apparatus for expansion cards of claim 3, wherein the positioning member further comprises a front wall and a sidewall, and each of the front wall and the sidewall is connected to the top wall; the front wall is configured to abut against the installation piece, and the front wall is substantially perpendicular to the installation plate.

5. The mounting apparatus for expansion cards of claim 4, wherein an inserting portion protrudes from the front wall, a gap is defined between the inserting portion and the front wall, and the gap is configured to receive the installation piece.

6. The mounting apparatus for expansion cards of claim 4, wherein the cage further comprises a positioning plate, and the positioning plate is substantially perpendicular to the installation plate; the positioning member further comprises a connecting piece and a positioning piece; the connecting piece abuts against the positioning plate, and the positioning piece abuts against the installation plate.

7. The mounting apparatus for expansion cards of claim 6, wherein the positioning piece is substantially parallel the top wall and defines a cutout, and the cutout is configured to secure the positioning piece to the installation plate.

8. The mounting apparatus for expansion cards of claim 6, wherein the positioning member further comprises a bottom wall connected to each of the sidewall and the front wall; a limiting piece extends from the bottom wall, the connecting piece extends from the top wall, and an extending direction of the limiting piece is opposite to an extending direction of the connecting piece; an arching portion extends from the positioning plate, and the limiting piece is received between the arching portion and the positioning plate.

9. The mounting apparatus for expansion cards of claim 6, wherein the positioning plate defines an installation slot, the front wall defines a positioning slot, and the installation slot is aligned with the positioning slot.

10. The mounting apparatus for expansion cards of claim 9, wherein two limiting protrusions are located on the installation plate, each of the two limiting protrusions is located on an opposite side of the installation slot, and the connecting piece is located between the two limiting protrusions.

11. A mounting apparatus for expansion cards comprising:
  a cage of a chassis comprising a positioning plate and an installation plate, the positioning plate is adapted to secure a first end of a first expansion card, and the installation plate is adapted to secure the first expansion card by a first installation piece secured to the first end of the first expansion card;

a positioning member removably mounted to the cage and comprising a top wall, the top wall being adapted to secure a second expansion card by a second installation piece secured to a side of the second expansion card, the second expansion card having a height smaller than a height of the first expansion card; and a bracket secured to the cage and being adapted to hold the first expansion card and the second expansion card;

wherein a distance between the installation plate and the top wall is substantially equal to an altitude difference between the first installation piece and the second installation piece.

12. The mounting apparatus for expansion cards of claim 11, wherein the top wall is substantially perpendicular to the positioning plate and substantially parallel to the installation plate.

13. The mounting apparatus for expansion cards of claim 11, wherein the second expansion is a low profile card, the top wall defines a locking hole, and the locking hole is configured to secure the top wall to the second installation piece.

14. The mounting apparatus for expansion cards of claim 11, wherein the positioning member further comprises a front wall and a sidewall, and each of the front wall and the sidewall is connected to the top wall; the front wall is configured to abut against the second installation piece, and the front wall is substantially parallel to the positioning plate.

15. The mounting apparatus for expansion cards of claim 14, wherein an inserting portion protrudes from the front wall, a gap is defined between the inserting portion and the front wall, and the gap is configured to received the installation piece.

16. The mounting apparatus for expansion cards of claim 14, wherein the positioning member further comprises a connecting piece and a positioning piece, the connecting piece abuts against the positioning plate, and the positioning piece abuts against the installation plate.

17. The mounting apparatus for expansion cards of claim 16, wherein the positioning piece is substantially parallel the top wall and defines a cutout, and the cutout is configured to secure the positioning piece to the installation plate.

18. The mounting apparatus for expansion cards of claim 16, wherein the positioning member further comprises a bottom wall connected to each of the sidewall and the front wall; a limiting piece extends from the bottom wall, the connecting piece extends from the top wall, and an extending direction of the limiting piece is opposite to an extending direction of the connecting piece; an arching portion extends from the positioning plate, and the limiting piece is received between the arching portion and the positioning plate.

19. The mounting apparatus for expansion cards of claim 16, wherein the positioning plate defines an installation slot, the front wall defines a positioning slot, and the installation slot is aligned with the positioning slot.

20. The mounting apparatus for expansion cards of claim 19, wherein two limiting protrusions are located on the installation plate, each of the two limiting protrusions is located on each opposite side of the installation slot, and the connecting piece is located between the two limiting protrusions.

* * * * *